(12) United States Patent
Yoshida et al.

(10) Patent No.: US 7,911,725 B2
(45) Date of Patent: Mar. 22, 2011

(54) HARD DISK, CONTROL UNIT FOR A DISK DEVICE, AND METHOD FOR CONTROLLING A DISK DEVICE

(75) Inventors: Kenji Yoshida, Tokyo (JP); Yuuichi Abe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/165,459

(22) Filed: Jun. 30, 2008

(65) Prior Publication Data

US 2009/0153999 A1 Jun. 18, 2009

(30) Foreign Application Priority Data

Dec. 12, 2007 (JP) ................... 2007-320743

(51) Int. Cl.
*G11B 5/09* (2006.01)
(52) U.S. Cl. .......................... 360/53; 360/47
(58) Field of Classification Search .................. None
See application file for complete search history.

(56) References Cited

U.S. PATENT DOCUMENTS

| | | | | |
|---|---|---|---|---|
| 5,367,652 A | * | 11/1994 | Golden et al. | 711/4 |
| 5,619,723 A | * | 4/1997 | Jones et al. | 710/3 |
| 5,751,733 A | * | 5/1998 | Glover | 714/765 |
| 5,844,911 A | * | 12/1998 | Schadegg et al. | 714/710 |
| 6,094,317 A | * | 7/2000 | Chung | 360/53 |
| 6,101,619 A | * | 8/2000 | Shin | 714/710 |
| 6,412,042 B1 | * | 6/2002 | Paterson et al. | 711/112 |
| 7,188,226 B2 | * | 3/2007 | de Brebisson et al. | 711/170 |

FOREIGN PATENT DOCUMENTS

| | | |
|---|---|---|
| JP | 05-114254 | 5/1993 |
| JP | 10-275429 | 10/1998 |
| JP | 11-213568 | 8/1999 |
| JP | 2001-167527 | 6/2001 |

OTHER PUBLICATIONS

An English translation of Notice of Reasons for Rejection issued by the Japan Patent Office on Dec. 24, 2008.

* cited by examiner

*Primary Examiner* — K. Wong
(74) *Attorney, Agent, or Firm* — Knobbe, Martens Olson & Bear LLP

(57) ABSTRACT

A hard disk includes: a plurality of servo areas which are elongated radially from a center of the hard disk to an outward thereof over tracks thereof; and a plurality of data areas which are respectively provided between the plurality of servo areas; wherein alternative operation is conducted per servo sector containing one of the plurality of servo areas and a data area provided subsequent to the one of the plurality of servo areas and having a defect created therein when a user sector containing at least a portion of the data area and functioning as an access unit has the defect therein.

8 Claims, 4 Drawing Sheets

HARD DISK, CONTROL UNIT FOR A DISK DEVICE, AND METHOD FOR CONTROLLING A DISK DEVICE

CROSS-REFERENCE TO RELATED APPLICATIONS

This application is based upon and claims the benefit of priority from the prior Japanese Patent Application No. 2007-320743, filed on Dec. 12, 2007; the entire contents of which are incorporated herein by reference.

BACKGROUND OF THE INVENTION

1. Field of the Invention

The present invention relates to a hard disk, a control unit for a disk device, and a method for controlling a disk device.

2. Description of the Related Art

In a disk device such as a magnetic disk device realizing the recording/reproducing operation by a head, the head seek is normally conducted by means of sector servo system so that the head can be disposed at a predetermined position of the disk. The head seek according to the sector servo system is conducted based on the servo data recorded in the disk (magnetic disk) as a recording medium. The servo data includes cylinder data (cylinder codes) representing cylinder numbers, sector data representing sector numbers (servo sector numbers) and burst data representing the position information (position errors in the cylinders represented by the corresponding cylinder data) as the corresponding amplitudes of waves.

The areas for the servo data to be recorded in the disk are called as "servo areas" which are arranged at a predetermined distance over the tracks in the disk so as to be elongated radially from the center thereof. The data areas (user areas) are provided between the servo areas, respectively, so that a plurality of data sectors are defined in each of the data areas. One servo area and the data area subsequent to the servo area constitute the servo sector.

In a magnetic disk device utilizing the position-determining control by means of the sector servo system, the writing operation may not be conducted when some scratches are formed at the surface of the magnetic disk. Conventionally, in this case, the user sector containing at least a portion of the data area with the scratches and functioning as an access unit from a host system is defined as a "disabled area", so that an alternative sector provided in a corresponding spare area in the magnetic disk is allotted in substitution for the disabled user sector. In this case, a user continues to use the magnetic disk device even though the intended data area becomes disabled due to the scratches of the magnetic disk.

Reference 1 teaches that when the occurrence frequency of write fault is low, retry operation is conducted per user sector, and when the occurrence frequency is high, the corresponding servo sector is recognized as a disabled servo sector so that all of the data sectors to be conducted in write operation and containing the top data sector of write fault are substituted.

In Reference 1, however, the alternative process is conducted per user sector only if a servo sector is recognized as a disabled servo sector after the retry operation is conducted several times.

Recently, on the other hand, the length of user sector in a hard disk intends to be enlarged from 512 byte to 4 k byte so that the length of user sector may become larger than the length of serve sector, particularly in the inner area of the hard disk. In this case, the alternative operation per user sector may deteriorate the writing capacity for the hard disk.

In contrast, in Reference 1, since the alternative operation is conducted per user sector, the writing efficiency for the hard disk may be enhanced when the length of user sector becomes larger than the length of servo sector. In Reference 1, however, the alternative operation is conducted only if a given servo sector is recognized as a disabled servo sector after the repeated retry operation so that it takes a long period of time to conduct the alternative operation per servo sector.

[Reference 1] JP-A 10-275429 (KOKAI)

BRIEF SUMMARY OF THE INVENTION

It is an object of the present invention to shorten the period of time for conducting the alternative operation for a data area containing defects, particularly when the length of user sector in a hard disk is enlarged.

In order to achieve the above object, an aspect of the present invention relates to a hard disk, including: a plurality of servo areas which are elongated radially from a center of the hard disk to an outward thereof over tracks thereof; and a plurality of data areas which are respectively provided between the plurality of servo areas; wherein alternative operation is conducted per servo sector containing one of the plurality of servo areas and a data area provided subsequent to the one of the plurality of servo areas and having a defect created therein when a user sector containing at least a portion of the data area and functioning as an access unit has the defect therein.

Another aspect of the present invention relates to a control unit for a disk device which is configured such that a disk write operation or a disk read operation is conducted for data sectors containing a starting data sector indicated at an intended track of a hard disk after seek control and position-determining control is conducted based on servo data recorded in the hard disk to move a head onto the intended track, including: a defective user sector-detecting unit for checking a defective user sector on the intended track during the seek control and the position-determining control; and an alternative processing unit for, when the defective user sector is detected, conducting alternative operation per servo sector containing a servo area and a data area provided subsequent to the servo area and having a defect of the defective user sector.

Still another aspect of the present invention relates to a hard disk device, including: a hard disk as defined above; a head for conducting a disk write operation or a disk read operation for the hard disk; and a control unit for a disk device as defined above.

A further aspect of the present invention relates to a method for controlling a disk device which is configured such that a disk write operation or a disk read operation is conducted for data sectors containing a starting data sector indicated at an intended track of a hard disk after seek control and position-determining control is conducted based on servo data recorded in the hard disk to move a head onto the intended track, including: checking and detect a defective user sector on the intended track during the seek control and the position-determining control during the seek control and the position-determining control; and conducting, when the defective user sector is detected, alternative operation per servo sector containing a servo area and a data area provided subsequent to the servo area and having a defect of the defective user sector.

According to the aspects of the present invention can be shorten the period of time for conducting the alternative operation for a data area containing defects, particularly when the length of user sector in a hard disk is enlarged.

DETAILED DESCRIPTION OF THE INVENTION

Hereinafter, the present invention will be described in detail with reference to the drawings.
(Hard Disk)

Figure 1:
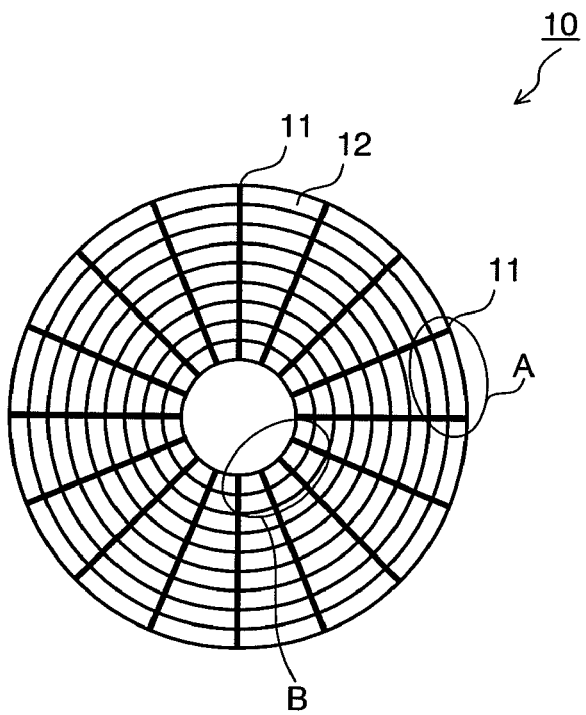
FIG. 1 is a plan view schematically showing the structure of a hard disk.
Figure 2:
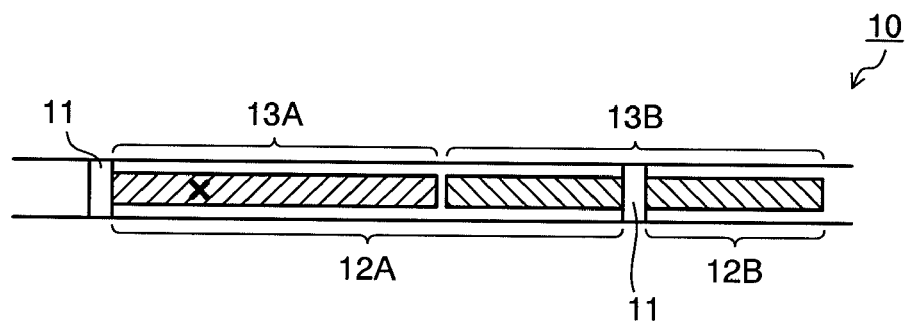
FIG. 2 is a cross sectional view schematically showing the structure of a conventional hard disk.
Figure 3:
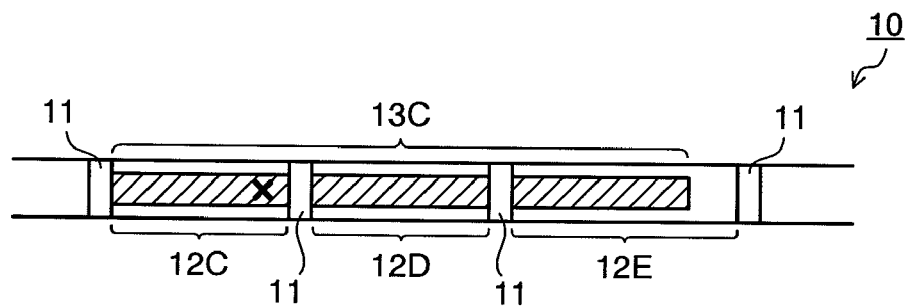
FIG. 3 is also a cross sectional view schematically showing the structure of the conventional hard disk.
Figure 4:
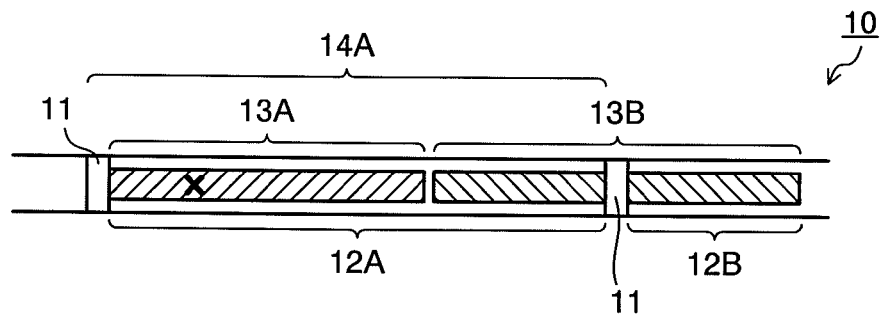
FIG. 4 is a cross sectional view schematically showing the structure of a hard disk according to an embodiment.
Figure 5:
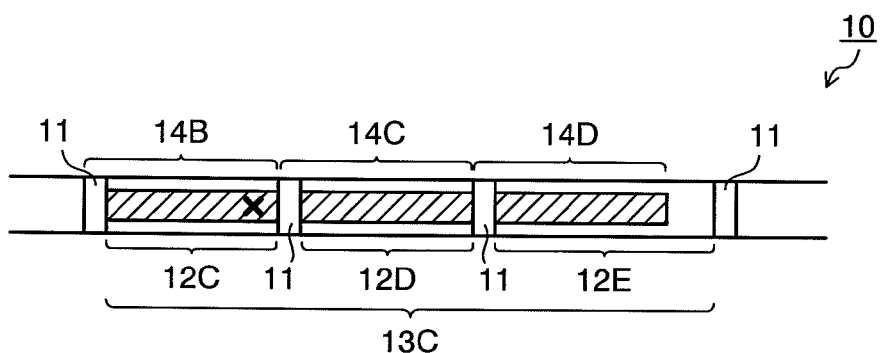
FIG. 5 is also a cross sectional view schematically showing the structure of the hard disk according to the embodiment.

FIG. 1 is a plan view schematically showing the structure of a hard disk. FIGS. 2 and 3 are cross sectional views schematically showing the structure of a conventional hard disk. FIGS. 4 and 5 are cross sectional views schematically showing the structure of a hard disk according to an embodiment. Like or corresponding constituent components are designated by the same reference numerals through FIGS. 1 to 5.

As shown in FIG. 1, the hard disk 10 includes a plurality of servo areas 11 arranged over tracks and elongated radially from the center thereof and a plurality of data areas 12 provided between the corresponding serve areas 11.

In the conventional hard disk, for example, at least a portion of the data area 12A is allotted to the user sector 13A and 13B in the outer area designated by reference character "A" as shown in FIG. 2. Then, the data area 12A and a portion of the adjacent data area 12B are allotted to the user sector 13B so that the user sector 13B is defined over the data areas 12A and 12B. The user sector is defined as an access unit from a host system, for example. Since the lengths of all of the user sectors are set equal to one another over the hard disk 10, the user sector 13C is allotted to the data areas 12C, the data area 12D and a portion of the data area 12E in the inner area designated by reference character "B" as shown in FIG. 3.

In the conventional hard disk 10, for example, if the defect "X" is created in the area belonging to the user sector 13A of the data area 12A, the user sector 13A is entirely substituted by another user sector. Similarly, if the defect "X" is created in the area of the data area 12C, the user sector 13C containing the data area 12C is entirely substituted by another user sector. In other words, if the defect "X" is created in a given data area in the conventional hard disk, the alternative operation is conducted for the user sector containing the data area with the defect "X" therein.

In the outer area as shown in FIG. 2, since the length of the data area 12A is larger than the length of the user sector 13A or the like, the writing efficiency for the hard disk 10 is not much deteriorated when the alternative operation is conducted per user sector. In the inner area as shown in FIG. 3, in contrast, since the length of the data area 12C is smaller than the length of the user sector 13C, the writing efficiency for the hard disk 10 is deteriorated when the alternative operation is conducted per user sector because the data areas 12D and 12E are also substituted.

In the hard disk according to this embodiment, for example, the servo sector 14A is defined so as to contain the servo area 11 and the subsequent data area 12A in the outer area "A", as shown in FIG. 4. In the inner area "B", the servo sector 14B is defined so as to contain the servo area 11 and the subsequent data area 12C, and the servo sector 14C is defined so as to contain the servo area 11 and the subsequent data area 12D, and the servo sector 14D is defined so as to contain the servo area 11 and the subsequent data area 12E, as shown in FIG. 5.

In FIGS. 4 and 5, the user sectors 13A, 13B and 13C can be allotted in the hard disk 10 in the same manner as shown in FIGS. 2 and 3.

In the hard disk 10 according to this embodiment, for example, if the defect "X" is created in the area belonging to the user sector 13A containing the data area 12A, the servo sector 14A containing the data area 12A is entirely substituted by another servo sector. Namely, the alternative operation is conducted for the servo sector 14A and not for the user sector 13A. Similarly, if the defect "X" is created in the area of the data area 12C, the servo sector 14B containing the data area 12C is entirely substituted by another servo sector. Namely, the alternative operation is conducted for the servo sector 14B and not for the user sector 13C. In other words, if the defect "X" is created in a given data area in the hard disk, the alternative operation is conducted for the servo sector containing the data area with the defect "X" therein.

In the outer area as shown in FIG. 4, since the length of the servo sector 14A is larger than the length of the user sector 13A or the like, the writing efficiency for the hard disk 10 is deteriorated when the alternative operation is conducted per servo sector and not per user sector. In the inner area as shown in FIG. 5, in contrast, since the length of the servo sector 14B is smaller than the length of the user sector 13C, the writing efficiency for the hard disk 10 can not be deteriorated when the alternative operation is conducted per servo sector and not per user sector because the data areas 12D and 12E not containing the defect "X" are not substituted.

When the alternative operation is conducted per user sector in the use of the conventional hard disk, the writing efficiency is deteriorated particularly in the inner area of the hard disk. In contrast, when the alternative operation is conducted per servo sector in the use of the hard disk according to this embodiment, the writing efficiency can not be deteriorated particularly in the inner area of the hard disk.

In the future, however, since the length of user sector in a hard disk intends to be enlarged, e.g., from 512 byte to 4 k byte, the writing efficiency may be deteriorated in the outer area of the hard disk when the alternative operation is conducted per user sector. In this embodiment, since the servo sector is defined independent from the user sector and then, the alternative operation is conducted per servo sector, the writing efficiency is not affected when the length of user sector is enlarged.

In this point of view, if the length of user sector is enlarged in the future, the alternative operation per servo sector is advantageous to the writing efficiency in both of the outer area and the inner area of the hard disk in comparison with the alternative operation per user sector.

In this embodiment, since the servo sector containing the data area containing the defect "X" is substituted immediately under no retry operation, the intended alternative operation can be conducted in a short period of time. On the other hand, according to Reference 1, the retry operation is conducted several times so that when a given servo sector is recognized as the disabled servo sector containing the defect "X", the disabled servo sector is substituted by another servo sector, thereby requiring a long period of time for the alternative operation.

Then, the concrete alternative operation will be described hereinafter.

Figure 6:
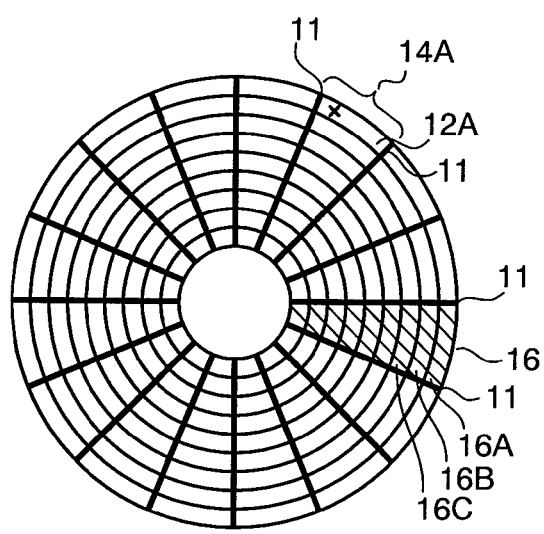
FIG. 6 is an explanatory view relating to an alternative operation per servo sector according to an embodiment.

FIG. 6 is an explanatory view relating to the alternative operation per servo sector in this embodiment. In FIG. 6, the alternative servo area 16 for the alternative operation is provided entirely between the corresponding servo areas 11. The alternative area 16 includes a plurality of alternative servo sectors 16A, 16B, 16C . . . which are arranged radially from the periphery to the center of the hard disk 10. Each servo sector functions as an alternative servo sector for a servo sector containing the defect "X".

When the defect "X" is created in the data area 12A at the periphery of the hard disk 10, the servo sector 14A containing the data area 12A is substituted by the alternative servo sector 16A with the same length as the servo sector 14A in the alternative area 16. When the defect "X" is created in a data area at any position of the hard disk 10 from the periphery to the center thereof, the servo sector containing the data area with the defect is substituted by an alternative servo sector with the same length as the servo sector to be substituted in the alternative area 16.

Figure 7:
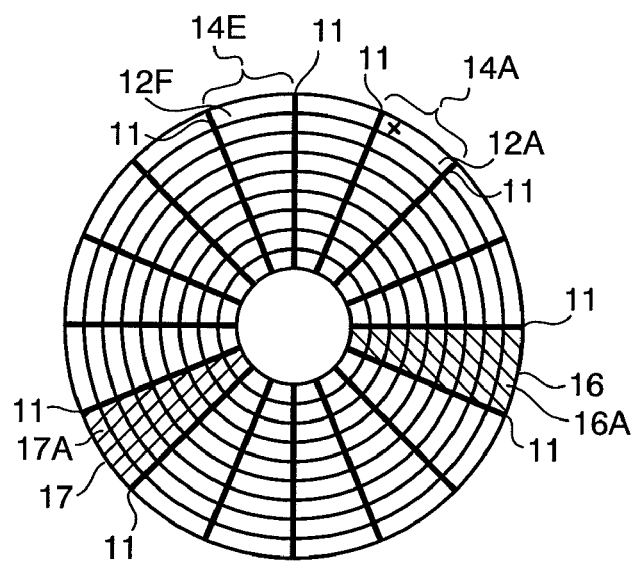
FIG. 7 is another explanatory view relating to an alternative operation per servo sector according to an embodiment.

FIG. 7 is another explanatory view relating to the alternative operation per servo sector in this embodiment. In FIG. 6, only the alternative area 16 is provided entirely between the corresponding servo areas 11, but in FIG. 7, the alternative area 17 is also provided entirely between the corresponding servo areas 11 in addition to the alternative area 16.

In this case, if another defect is created in the data area 12F of the hard disk 10 at the periphery thereof in addition to the data area 12A with the defect "X", the servo sector 14A containing the data area 12A is substituted by the alternative servo sector 16A with the same length as the servo sector 14A in the alternative area 16 and the servo sector 14E containing the data area 12F is substituted by the alternative servo sector 17A with the same length as the servo sector 14E in the alternative servo area 17.

In this embodiment, namely, since the two sets of the alternative areas 16 and 17 are provided, even though two defects are created in the corresponding servo sectors with the same length as one another, the servo sectors with defects can be substituted simultaneously by the corresponding alternative servo sectors in the alternative areas 16 and 17. As a result, the alternative operation can be conducted efficiently. The number of alternative area is not limited to one or two as shown in FIGS. 6 and 7, but may be set to any number as occasion demands.

Figure 8:
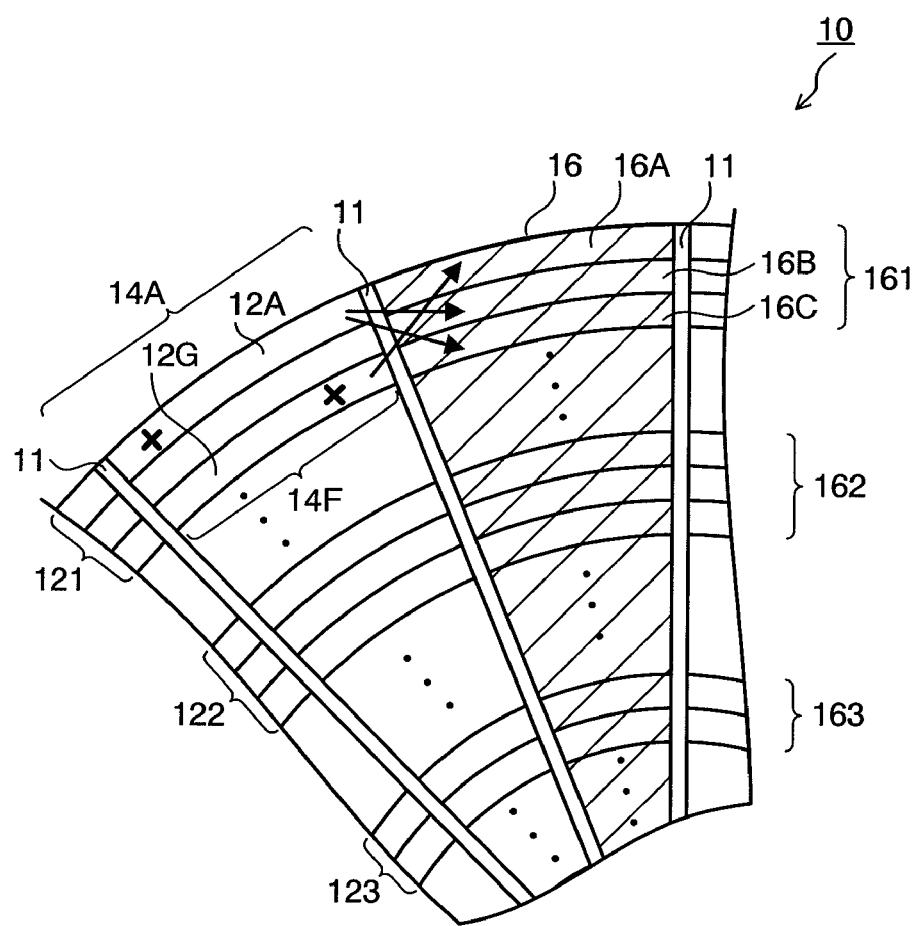
FIG. 8 is still another explanatory view relating to an alternative operation per servo sector according to an embodiment.

FIG. 8 is still another explanatory view relating to the alternative operation per servo sector in this embodiment. FIG. 8 shows a portion of the hard disk in enlargement. For simplification, the alternative area is provided adjacent to the servo sector area to be substituted.

In FIG. 8, the servo sector area containing the data area 12A and the like is divided into a plurality of servo sector zones 121, 122, 123, . . . arranged radially in the hard disk 10. In each zone, the lengths of the servo sectors are set substantially equal to one another. Similarly, the alternative area 16 is divided into a plurality of alternative zones 161, 162, 163, . . . arranged radially in the hard disk 10. The zones 121, 122, 123 . . . correspond to the alternative zones 161, 162, 163, . . . , respectively. For example, the alternative zone 161 corresponds to the zone 121 in the servo sector.

The lengths of the alternative servo sectors included in the alternative zone 161 are set equal to the lengths of the servo sectors included in the zone 121. The lengths of the alternative servo sectors included in the alternative zone 162 are set equal to the lengths of the servo sectors included in the zone 122. The lengths of the alternative servo sectors included in the alternative zone 163 are set equal to the lengths of the servo sectors included in the zone 123.

For example, therefore, in the case that the defect "X" is created in the data area 12A so that the servo sector 14A containing the data area 12A in the zone 121 is substituted by the alternative servo sector 16C in the alternative zone 161, when the defect "X" is also created in the data area 12G and thus, the servo sector 14F containing the data area 12G must be substituted, the servo sector 14F can be substituted by the alternative servo sectors 16A or 16B because the lengths of the alternative servo sectors 16A and 16B are set equal to the length of the servo sector 14F.

The number of zone can be determined appropriately as occasion demands.

(Disk Device)

Then, a disk device containing a hard disk as described above and a controlling method of the disk device will be described hereinafter.

Figure 9:
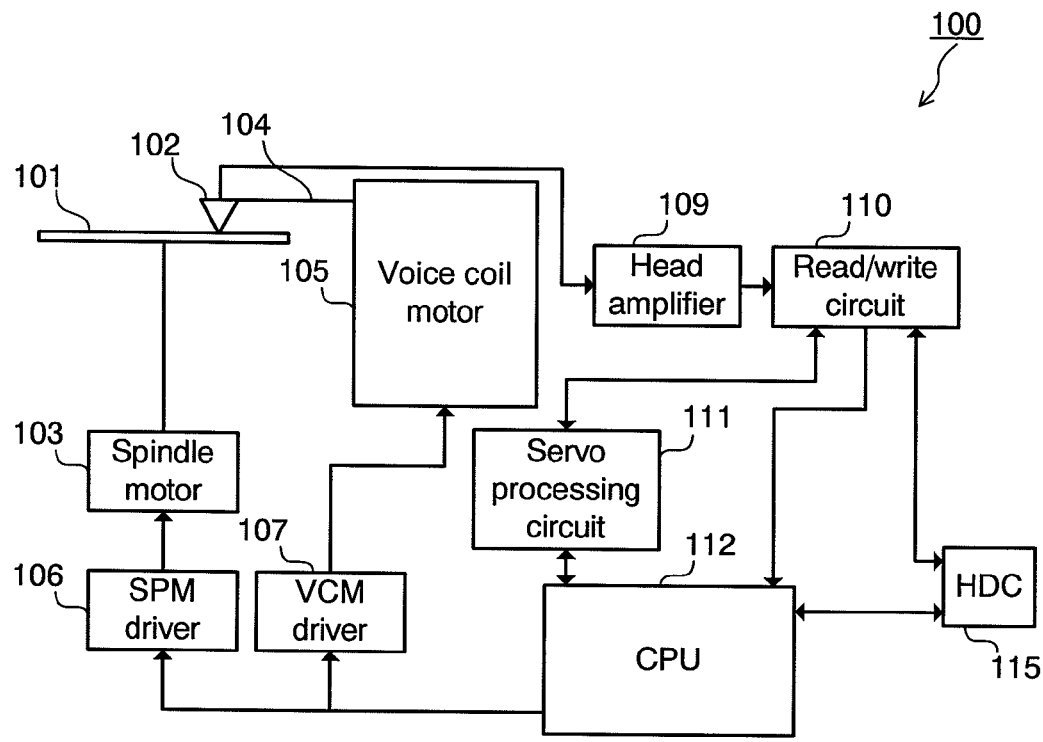
FIG. 9 is a block diagram showing the structure of a disk device according to an embodiment.
Figure 10:
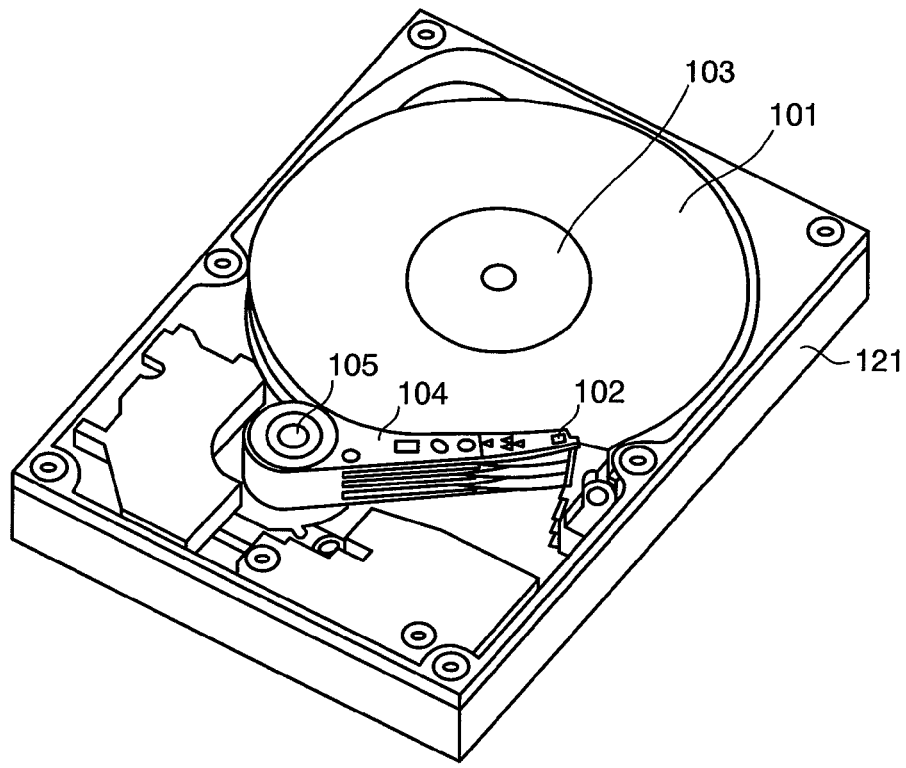
FIG. 10 is a structural view showing the structure of the head and the related constituent components in the disk device shown in FIG. 9.

FIG. 9 is a block diagram showing the structure of the disk device in this an embodiment, and FIG. 10 is a structural view showing the structure of the head containing the related constituent components in the disk device shown in FIG. 9. In FIG. 9, the structure around the head is simplified.

In the disk device 100 in this embodiment, as shown in FIG. 9, a head 102 is provided in contact with or not in contact with a hard disk 101. The head 102 functions as conducting the writing/reading operation for the hard disk 101. The hard disk 101 is connected with a spindle motor (SPM) 103 so as to be rotated at high velocity. The head 102 is attached to a head moving mechanism called as a carriage 104 so as to be moved radially on the hard disk 101 through the movement of the carriage 104. The carriage 104 is operated by a voice coil motor (VCM) 105.

The spindle motor (SPM) 103 is connected with the SPM driver 106 and then, operated by the control current supplied from the SPM driver 106. The voice coil motor (VCM) 105 is connected with a VCM driver 107 and then, operated by the control current supplied from the VCM driver 107. The control currents to be supplied to the spindle motor (SPM) 103 and the voice coil motor (VCM) 105 are controlled and determined by a CPU (microprocessor) 112.

For example, the head 102 is connected with a head amplifying circuit 109 mounted on a flexible printed circuit (FPC).

The head amplifying circuit 109 conducts the switching of the head 102 and the input/output of read/write signal for the head 102.

The head 102, the spindle motor (SPM) 103, the carriage 104, the voice coil motor (VCM) 105, the SPM driver 106, the VCM driver 107 and the head amplifying circuit 109 constitute the head unit of the disk device in this embodiment.

A read/write circuit 110 includes a decode function (read channel) for processing a signal requiring for conducting data reproducing operation after the signal is read out from the hard disk 101 with the head 102 and then, amplified with the head amplifying circuit 109, an encode function (write channel) for processing a signal requiring for conducting data recording operation for the hard disk 101, and a signal processing function for extracting a burst data in a servo data requiring for conducting servo processing such as head position determining control.

A serve processing circuit 111 conducts a signal processing requiring for conducting the servo processing on the data reproduced by the read/write circuit 110. Namely, the servo processing circuit 111 includes a timing generating function for generating a timing signal such as a servo gate and a decode function which extracts and decodes the cylinder number and servo sector number of the servo data recorded in the serve area. The servo gate is well known as a timing signal of the data reproduced by the read/write circuit 110 which is effective during the period of time corresponding to the length of the servo area.

The CPU 112 may be constituted from one-chip microprocessor. The CPU 112 controls the components of the disk device 100 according to a prescribed control program. Concretely, the CPU 112 conducts the seek/position-determining control for moving the head 102 onto a predetermined position of the hard disk 101 in accordance with the cylinder number of the servo data extracted by the servo processing circuit 111 and the burst data of the servo data extracted by the read/write circuit 110, and the transfer control of the read/write data by a hard disk controller (HDC) 115.

The read/write circuit 110, the servo processing circuit 111, the CPU 112 and the hard disk controller (HDC) 115 constitute the control unit in this embodiment.

As shown in FIG. 10, the hard disk 101 is accommodated in a case 121 so that the spindle motor (SPM) 103 is inserted and fit into the center of the hard disk 101. The carriage 104 is provided adjacent to the hard disk 101. The head 102 is attached to the forefront of the carriage 104. The voice coil motor (VCM) 105 is inserted and fit into the carriage 104.

In FIG. 10, only the base of the case 121 is depicted for the explanation of the structure of the disk drive 100, but in real, the components such as the hard disk 101 are accommodated perfectly in the case 121 and thus, can not be recognized from the outside of the case 121. The hard disk 100 is configured as described in the embodiments.

Then, the operation of the disk device shown in FIG. 9 will be described. First of all, the data recorded in the hard disk 101 is read out by the head 102 so that the read output (read signal) is amplified by the head amplifying circuit 109, and then, supplied to the read/write circuit 110. The read/write circuit 110 reproduces the data (servo area data and data area data) from the read signal amplified by the head amplifying circuit 109. The read/write circuit 109 extracts the burst data of the servo data from the data reproduced by the read/write circuit 110 in response to the timing signal supplied from the servo processing circuit 111.

The data reproduced by the read/write circuit 110 is supplied to the servo processing circuit 111 and the data extracted by the read/write circuit 110 is supplied to the CPU 112.

The serve processing circuit 111 generates the timing signal of the data reproduced by the read/write circuit 110 which is effective during the period of time corresponding to the length of the servo area, and extracts and decodes the cylinder data (cylinder number) and sector data (servo sector number) of the servo data recorded in the serve area. Generally, the servo data contains the inherent identification pattern (servo mark) for identifying the servo data (the serve area for the servo data to be recorded).

The timing signal for extracting the burst data which is generated by the servo processing circuit 111 is transmitted to the read/write circuit 110 so that the intended burst data is extracted based on the timing signal.

The cylinder number and servo sector number which are extracted and decoded by the servo processing circuit 111 are supplied to the CPU 112. The CPU 112 conducts the seek control so as to move the head 102 to a predetermined cylinder (track) based on the difference between the cylinder number extracted and decoded by the servo processing circuit 111 and the inherent cylinder number relating to the predetermined cylinder (track). Then, the CPU 112 conducts the position-determining control to position the head 102 at the center of the predetermined cylinder based on the burst data (positioning information) extracted by the read/write circuit 110.

The CPU 112 detects the servo area (intended servo area) containing the initial servo sector for starting the writing operation on the indication from the host device based on the servo sector number extracted and decoded by the servo processing circuit 111 after the seek control and the position-determining control. When the CPU 112 detects the intended servo area, the CPU 112 indicates the read/write operation (herein, write operation) for the HDC 115.

In this case, when the defect is created in the data area subsequent to the intended servo area so that the write operation can not be conducted, the CPU 112 conducts the seek/position-determining control to move the head 102 onto a predetermined alternative servo sector (servo area) in the alternative area. Therefore, the write operation is conducted for the data area included in the alternative servo sector and not in the inherent servo sector.

In this point of view, if the write operation can not be conducted for the data area initially intended in the hard disk 100, the alternative operation can be conducted immediately by the CPU 112 so that the alternative write operation can be conducted in a short period of time. Namely, if the defect is created in the hard disk 101, the write operation can be conducted effectively and efficiently in a short period of time.

As apparent from the above description, the CPU 112 functions as the defect detecting unit in the hard disk 101 and the alternative processing unit to conduct the alternative operation per servo sector.

Although the present invention was described in detail with reference to the above examples, this invention is not limited to the above disclosure and every kind of variation and modification may be made without departing from the scope of the present invention.

What is claimed is:

1. A hard disk device, comprising:
   a disk having a plurality of servo sectors and a plurality of user sectors,
   each servo sector comprising a servo area provided on a track and a data area provided on the track from the servo area to the next consecutive servo area,
   each user sector comprising user data to be stored in at least two data areas of the servo sectors; and
   a controller configured to identify a user sector having a defect among the user sectors, to identify a servo sector in which the defect is located among the servo sectors, and to substitute an alternative servo sector having substantially the same servo sector length as the servo sector in which the defect is located.

2. The hard disk device of claim 1, wherein the alternative servo sector is located in the same track as the servo sector in which the defect is located.

3. The hard disk device of claim 1, wherein the alternative servo sector is located in a different track than the servo sector in which the defect is located.

4. The hard disk device of claim 1, wherein the length of the data area in each servo sector is less than the length of each user sector.

5. A control unit for a hard disk device that includes a plurality of servo sectors and a plurality of user sectors, each servo sector comprising a servo area provided on a track and a data area provided on the track from the servo area to the next consecutive servo area, and each user sector comprising user data to be stored in at least two data areas of the servo sectors, the control unit for conducting a disk write operation or a disk read operation for the data areas, the control unit comprising:
   a defective user sector detector configured to identify a user sector having a defect among the user sectors and to identify a servo sector in which the defect is located among the servo sectors; and
   a processor configured to substitute an alternative servo sector having substantially the same servo sector length as the servo sector in which the defect is located.

6. The control unit of claim 5, the alternative servo sector is located in a different track than the servo sector in which the defect is located.

7. A control method for a hard disk device with a disk having a plurality of servo sectors and a plurality of user sectors,
   each servo sector comprising a servo area provided on a track and a data area provided on the track from the servo area to the next consecutive servo area, and
   each user sector comprising user data to be stored in at least two data areas of the servo sectors, the control method comprising:
   identifying a user sector having a defect among the user sectors;
   identifying a servo sector in which the defect is located among the servo sectors; and
   substituting an alternative servo sector having substantially the same servo sector length as the servo sector in which the defect is located.

8. The method of claim 7, wherein the alternative servo sector is located in a different track than the servo sector in which the defect is located.

* * * * *